United States Patent
Duan et al.

(10) Patent No.: US 8,164,889 B2
(45) Date of Patent: Apr. 24, 2012

(54) SLIDING AND TILTING MECHANISM AND PORTABLE ELECTRONIC DEVICE USING THE SAME

(75) Inventors: Chao Duan, Shenzhen (CN); Ke-Long Wu, Shenzhen (CN); Chia-Hua Chen, Taipei (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 151 days.

(21) Appl. No.: 12/819,287

(22) Filed: Jun. 21, 2010

(65) Prior Publication Data
US 2011/0075333 A1    Mar. 31, 2011

(30) Foreign Application Priority Data
Sep. 25, 2009    (CN) .......................... 2009 1 0307697

(51) Int. Cl.
*H05K 5/00* (2006.01)
*G09G 5/00* (2006.01)
*G06F 3/033* (2006.01)
*H04M 1/00* (2006.01)

(52) U.S. Cl. ......... 361/679.21; 361/679.26; 361/679.27; 361/679.28; 361/679.29; 361/679.3; 361/679.56; 345/156; 345/168; 345/169; 455/575.1; 455/575.3; 455/575.4; 455/575.8

(58) Field of Classification Search ............. 361/679.01, 361/679.02, 679.08, 679.09, 679.21–679.3, 361/679.55–679.59; 345/156, 157, 168, 345/169, 184; 455/575.1, 575.3, 575.4, 575.8; 369/282, 291, 253, 44.16, 75.5
See application file for complete search history.

(56) References Cited

U.S. PATENT DOCUMENTS
2008/0174942 A1 *   7/2008   Yang et al. ................... 361/680
2010/0035669 A1 *   2/2010   Jang et al. .................. 455/575.4
2010/0149733 A1 *   6/2010   Luke et al. ............... 361/679.01

FOREIGN PATENT DOCUMENTS
CN        101340793 A        1/2009
* cited by examiner

*Primary Examiner* — Robert J Hoffberg
*Assistant Examiner* — Jerry Wu
(74) *Attorney, Agent, or Firm* — Altis Law Group, Inc.

(57) ABSTRACT

A portable electronic device is disclosed including a first part, a second part, and a sliding and tilting mechanism. The sliding and tilting mechanism includes a lower board fixed to the second part, an upper board fixed to the first part, an intermediate board positioned between the lower board and the upper board. The sliding and tilting mechanism further includes two elastic assemblies, a swinging member, and a cam member, all of which engage with each other to tilt the intermediate board and the upper board relative to the lower board after the upper board slides over a predetermined distance along the intermediate board.

13 Claims, 7 Drawing Sheets

SLIDING AND TILTING MECHANISM AND PORTABLE ELECTRONIC DEVICE USING THE SAME

CROSS-REFERENCE TO RELATED APPLICATION

This application is related to co-pending U.S. patent application Ser. No. 12/819,289, entitled "SLIDING AND TILTING MECHANISM AND PORTABLE ELECTRONIC DEVICE USING THE SAME", by Wu et al., which has the same assignee as the present application. The above-identified application is incorporated herein by reference.

BACKGROUND

1. Technical Field

The present disclosure relates to a sliding and tilting mechanism and a portable electronic device using the mechanism.

2. Description of Related Art

Conventional portable electronic devices can be classified into three different categories, bar-type devices, rotating-type devices, and sliding-type devices.

All three types of these electronic devices have the same following problems. When a user wants to watch a display of the electronic device that is resting on a table, they must use external support to hold the electronic device in a tilted position to give the display a better viewing angle. Alternatively, the user may hold the electronic device with his hands to get the proper viewing angle, however, this may become uncomfortable after a long time of viewing.

Therefore, there is room for improvement within the art.

BRIEF DESCRIPTION OF THE DRAWINGS

Many aspects of the present sliding and tilting mechanism and the portable electronic device can be better understood with reference to the following drawings. The components in the various drawings are not necessarily drawn to scale, the emphasis instead being placed upon clearly illustrating the principles of the present sliding and tilting mechanism and the portable electronic device. Moreover, in the drawings, like reference numerals designate corresponding parts throughout the diagrams.

DETAILED DESCRIPTION

Figure 1:
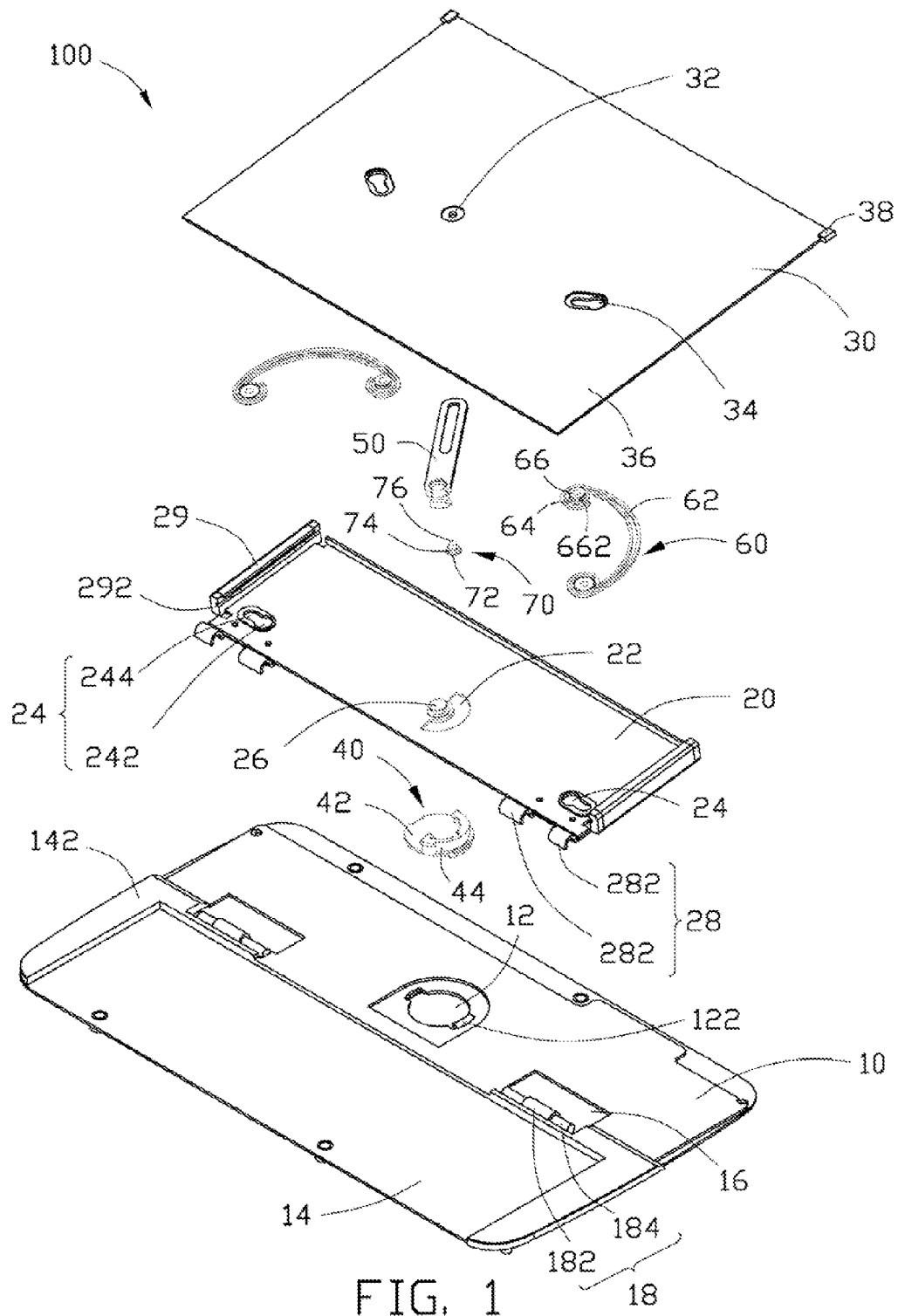
FIG. 1 is an exploded isometric view of an exemplary embodiment of a sliding and tilting mechanism, including an upper board, a lower board, a cam member and a swinging member.

FIG. 1 shows an exemplary sliding and tilting mechanism 100 including a lower board 10, a intermediate board 20, an upper board 30, a cam member 40, a swinging member 50, two elastic assemblies 60 and a pin member 70.

The lower board 10 defines a fixing hole 12, a mounting cavity 14 and two engaging grooves 16. The fixing hole 12 is defined at the substantial center of the lower board 10, and has opposite latching portions 122 on its periphery. The latching portions 122 fix the cam member 40 into the fixing hole 12. The rectangular mounting cavity 14 is positioned at the side of the fixing hole 12 for mounting a keypad module (not shown) therein. The opposite engaging grooves 16 are located at opposite sides of the fixing hole 12. The two engaging grooves 16 receive two hinge assemblies 18 abutting the mounting cavity 14. Each hinge assembly 18 includes a hinge barrel 182 and a hinge pin 184 rotatably received in the hinge barrel 182. The hinge barrel 182 secures to the lower board 10.

The intermediate board 20 is shorter than the lower board 10. The intermediate board 20 defines an engaging hole 22 and two first mounting holes 24. The engaging hole 22 is substantially positioned at the center of the intermediate board 20 for engaging the cam member 40. The two first mounting holes 24 are located at opposite corners of the intermediate board 20. Each first mounting hole 24 includes a first hole section 242 and a second hole section 244 communicating with the first hole section 242. The intermediate board 20 forms a pivot portion 26 at the center of the engaging hole 22. The swinging member 50 pivotably connects to the pivot portion 26. The intermediate board 20 has opposite clasping members 28 projecting from the flange and adjacent to the first mounting hole 24. Each clasping member 28 includes two spaced substantially parallel clasping portions 282 for clasping the hinge pin 184. The intermediate board 20 has two sliding rails 29 formed on its opposite sides. Each sliding rail 22 defines a sliding groove 292 for slidably engaging the upper board 30.

The upper board 30 defines a securing hole 32 and two second mounting holes 34. The securing hole 32 is for securing the pin member 70. The second mounting holes 34 have substantially the same structure as the first mounting holes 24. The two second mounting holes 34 are at opposite sides of the securing hole 32. The upper board 30 has opposite side portions 36 for slidably engaging into the sliding grooves 292. The upper board 30 has opposite blocking portions 38 at the tail ends of the side portions 36 for blocking with the sliding rails 29.

Figure 2:
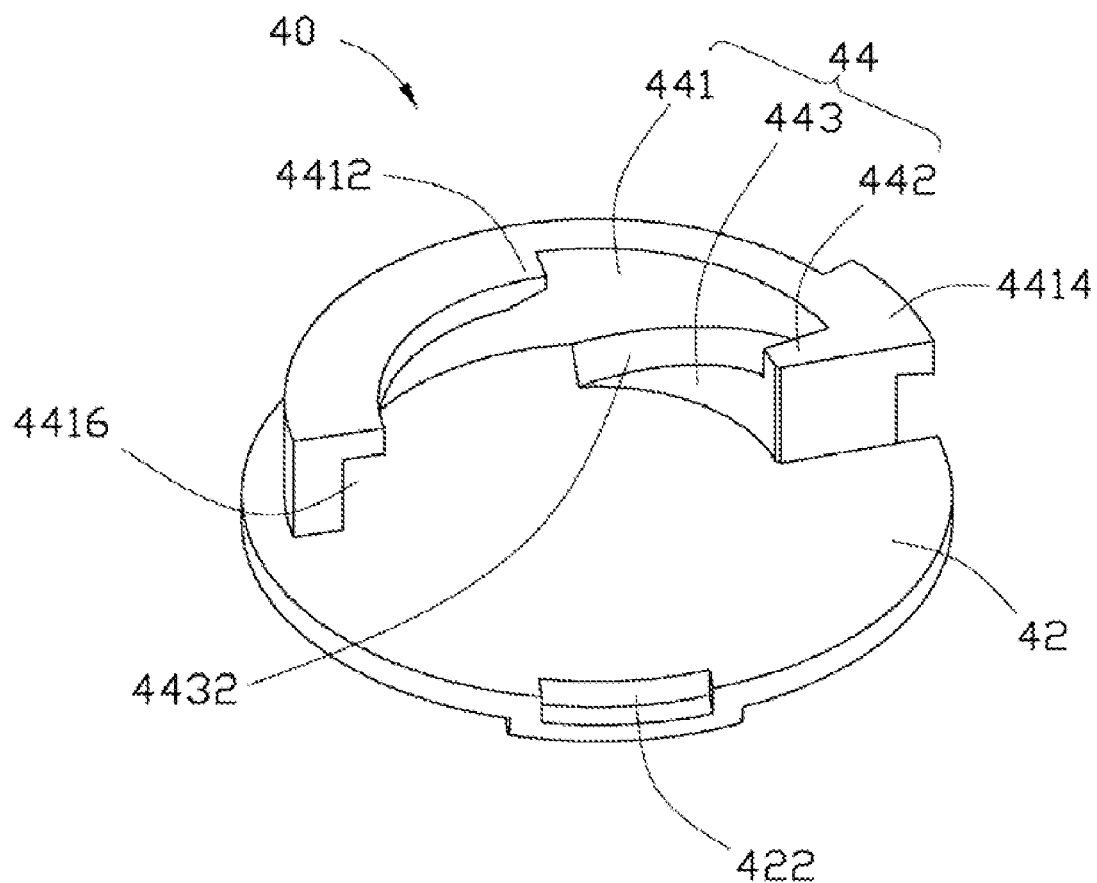
FIG. 2 is an isometric view of the cam member shown in FIG. 1.

FIG. 2 shows the cam member 40 including a bottom wall 42 and an engaging portion 44 protruding from the bottom wall 42. The bottom wall 42 is a circular disk having a larger diameter than the fixing hole 12. The bottom wall 42 defines opposite latching notches 422 on the circumferential flange. The latching notch 422 latches the latching portions 122 therein and accordingly latch the cam member 40 with the lower board 10. The engaging portion 44 includes an arcuate wall 441, a blocking wall 442, and a tilting portion 443. The arcuate wall 441 can engage through the engaging hole 22 of the intermediate board 20. The arcuate wall 441 has extended from the top an arcuate inner projection 4412 and an arcuate outer projection 4414. The inner projection 4412 extends from the tail end to the middle of the arcuate wall 441. The inner projection 4412, the arcuate wall 441, and the bottom wall 42 cooperatively define a guiding groove 4416. The outer projection 4414 extends from another opposite tail end towards the middle of the arcuate wall 441. The extension of the outer projection 4414 is shorter than the inner projection 4412.

The blocking wall 442 protrudes from the interior surface of the arcuate wall 441 towards the center of the arcuate wall 441, and is adjacent to the outer projection 4414. The blocking wall 442 is for blocking the swinging of the swinging member 50. The tilting portion 443 protrudes from the bottom wall 42 and connects with the interior surface of the arcuate wall 441. The tilting portion 443 further extends along the arcuate wall 441 from the middle of the arcuate wall 441 away from the inner projection 4412 to connect the blocking wall 442. The tilting portion 443 includes a tilting wall 4432 ascending along with the extension of the tilting portion 443. The tilting wall 4432 can tilt the swinging member 50 while swinging.

Figure 3:
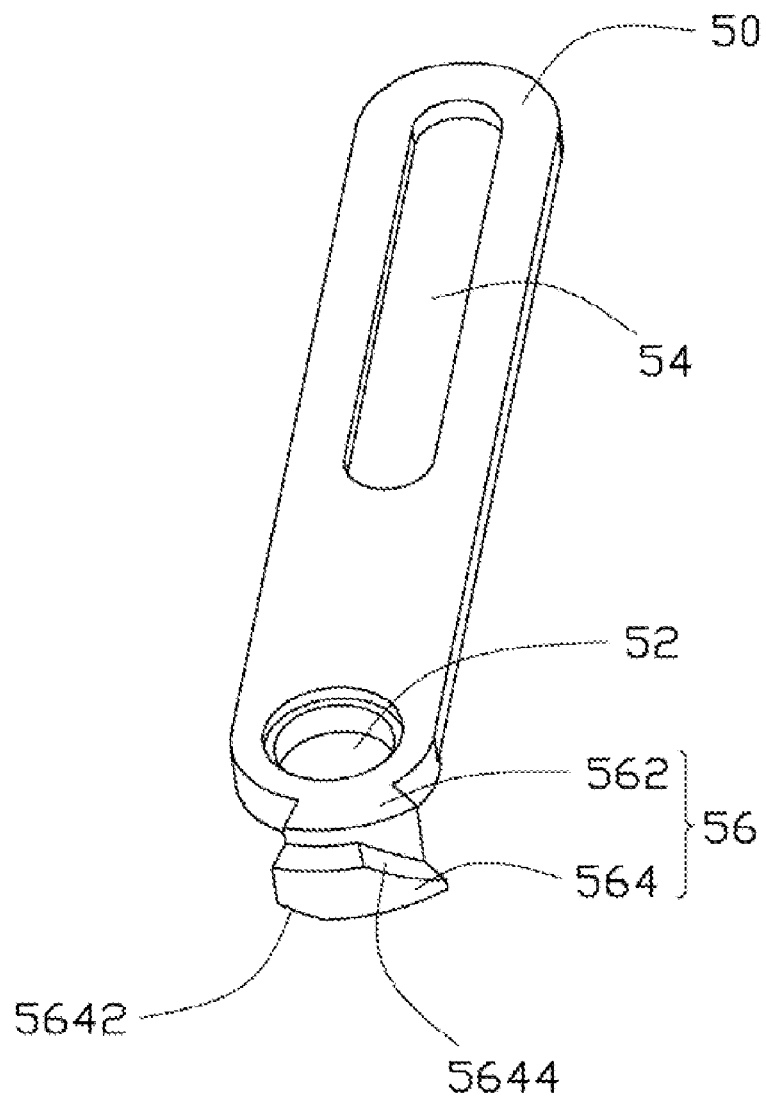
FIG. 3 is isometric view of the swinging member shown in FIG. 1.

FIG. 3 shows the swinging member 50 defining a hinge hole 52 and a guiding hole 54. The hinge hole 52 is defined through an end of the swinging member 50 for rotatably engaging the pivotable portion 26 of the intermediate board 20. The guiding hole 54 is a lengthwise hole along the extension of the swinging member. The swinging member 50 extends an end protrusion 56 adjacent to the hinge hole 52. The end protrusion 56 includes a protrusion body 562 and an engaging flange 564 connecting the protrusion body 562. The engaging flange 564 has substantially the same shape and size as the guiding groove 4416. The engaging flange 564 forms a first wedge-shaped surface 5642 at the corner of the bottom. The engaging flange 564 forms a second wedge-shaped surface 5644 at the corner of the top.

Referring back to FIG. 1, each elastic assembly 60 includes two arcuate elastic strips 62, two ring coils 64 and two latching portions 66. The two elastic strips 62 have similar structures with different curved ratios, and have the same ends fixing to the ring coils 64. The elastic strips 62 and the ring coils 64 are positioned at the same plane. The latching portions 66 have substantially the same size and shape as the first hole section 242. The latching portions 66 cooperatively define an annular slit 662 having substantially the same size as the second hole section 244. The latching portions 33 rotatably engage into the ring coils 62.

The pin member 70 includes a pin cap 72, a pin body 74 and a securing portion 76, The pin cap 72 is larger than the guiding hole 54 of the swinging member 50. The pin body 74 has substantially the same diameter as the guiding hole 54. The securing portion 76 is secured in the securing hole 32 of the upper board 30, enabling the pin member 70 to secure with the upper board 30.

Figure 4:
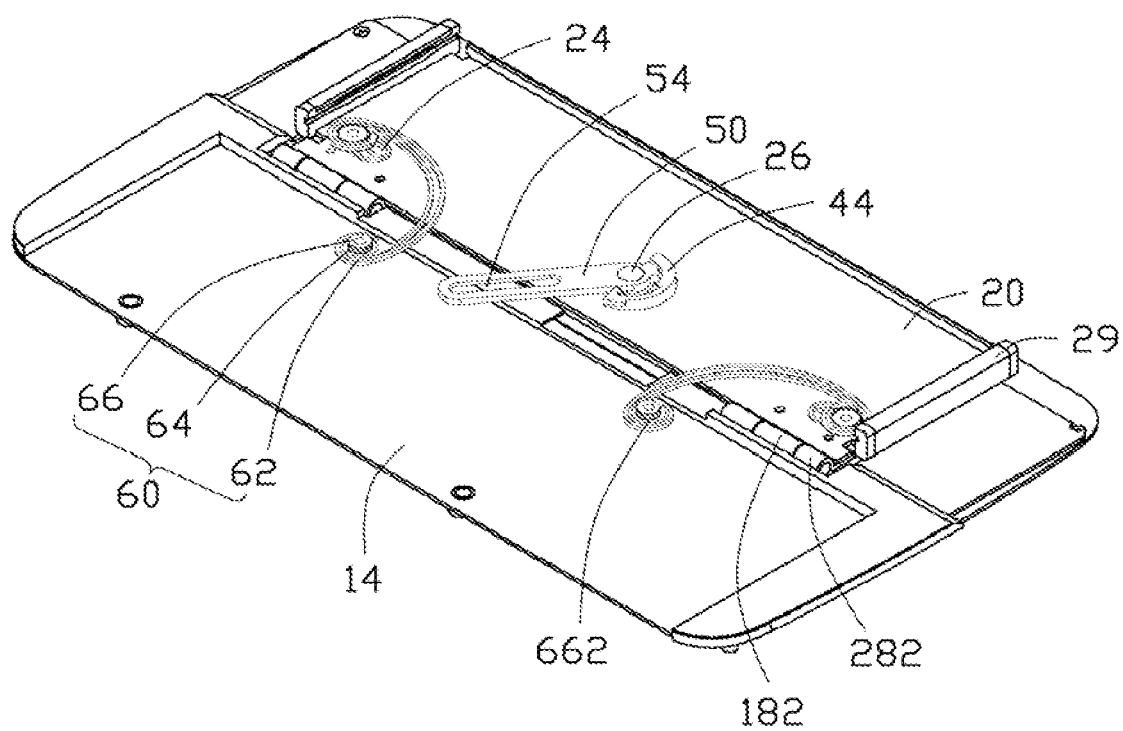
FIG. 4 is an assembled view of the sliding and tilting mechanism shown in FIG. 1 without showing the upper board.

Referring further to FIG. 4, during assembly of the sliding and tilting mechanism 100, the cam member 40 is mounted to the lower board 10 with the cam member 40 pressing into the fixing hole 12. The bottom wall 42 of the cam member 40 engages into the fixing hole 12, and the latching portions 122 latch into the latching notches 422 of the cam member 40. Accordingly, the cam member 40 is secured with the lower board 10. The intermediate board 20 is mounted to the lower board 10 with the engaging portion 44 of the cam member 40 engaging through the engaging hole 22 of the intermediate board 20. The hinge pin 184 engages through the clasping portions 282, pivotably connecting the intermediate board 20 with the lower board 10.

The swinging member 50 is mounted to the intermediate board 20 with the pivotable portion 26 pivotably engaging into the hinge hole 52. The engaging flange 564 extends into the guiding groove 4416 of the cam member 40. The elastic assemblies 60 are mounted to the intermediate board 20 with the latching portions 66 rotatably engaging into the first mounting holes 24 of the intermediate board 20. During this process, the latching portions 66 engage into the first hole section 242 and are slid into the second hole section 244 with the annular slit 662 engaging the second hole section 244.

The upper board 30 is mounted to the intermediate board 20. In this process, the side portions 36 of the upper board 30 engage into the sliding groove 292 of the intermediate board 20. The securing portion 76 of the pin member 70 passes through the guiding hole 54 of the swinging member 50 to secure within the securing hole 32 of the upper board 30. Each elastic assembly 60 is further secured into the second mounting hole 34 of the upper board 30. After this assembly, the elastic strips 62 are slightly extended to secure the latching portions 66 within the second hole section 244. Accordingly, the assembly of the sliding and tilting mechanism 100 is completed.

Figure 5:
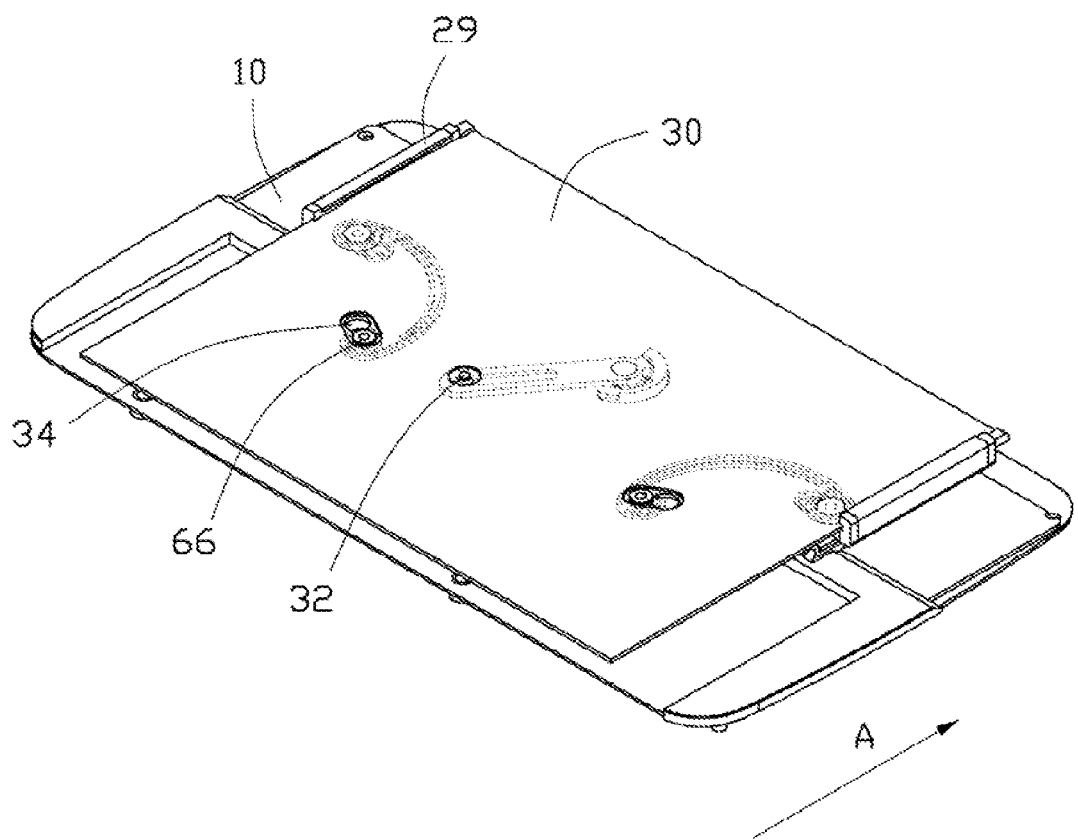
FIG. 5 is an assembled view of the sliding and tilting mechanism shown in FIG. 1 in a closed position.
Figure 6:
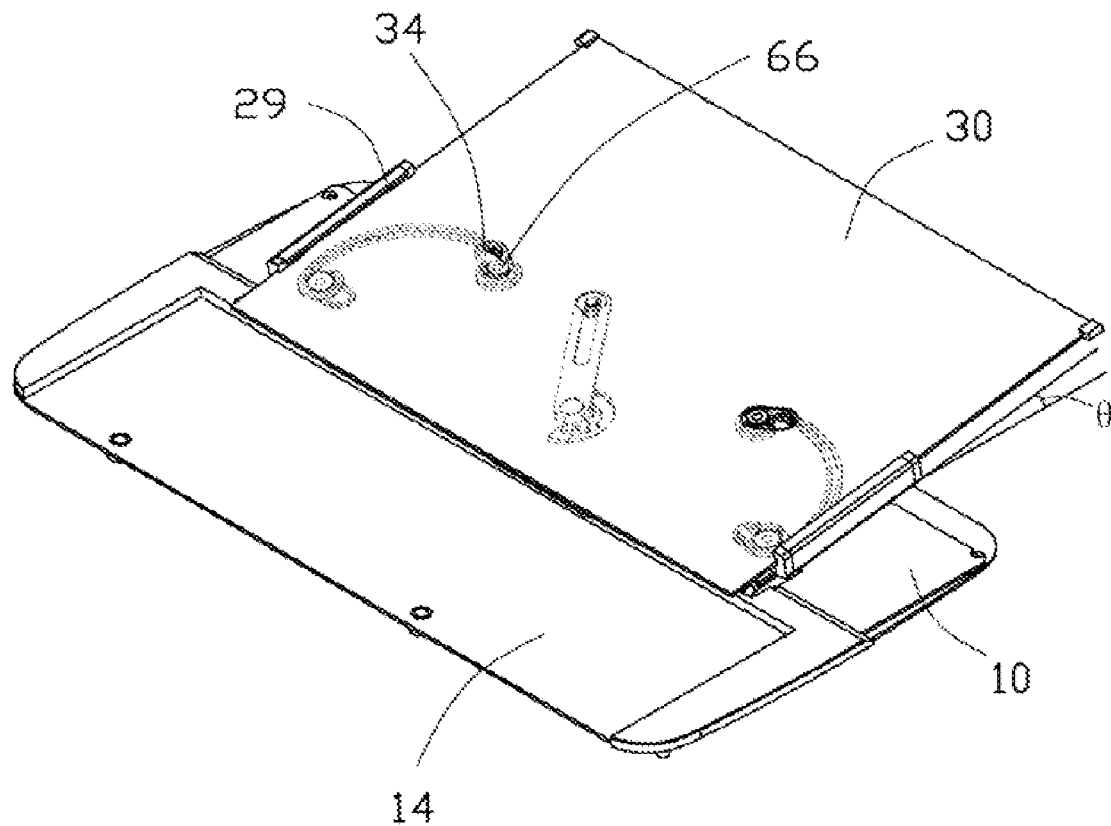
FIG. 6 is an assembled view of the sliding and tilting mechanism shown in FIG. 1 in an open position.

FIGS. 5 and 6 show the transferring of the sliding and tilting mechanism 100 from the closed position to the open position. When pushed along arrow line A (shown in FIG. 5), the upper board 30 slides relative to the intermediate board 20 and the lower board 10. The intermediate board 20 cannot move relative to the lower board 10, since the intermediate board 20 pivotably connects to the lower board 10, and is blocked by the engaging portion 44 of the cam member 40. Meanwhile, the sliding of the upper board 30 curves the elastic strips 62 further to accumulate potential elastic energies. The pin body 74 of the pin member 70 slides along the guiding hole 54 of the swinging member 50. The pin body 74 of the pin member 70 slides along the guiding hole 54 of the swinging member 50 and swings the swinging member 50 about the pivotable portion 26 relative to the intermediate board 20. The engaging flange 564 of the swinging member 50 slides within guiding groove 4416 towards the tilting portion 443 of the cam member 40.

When the upper board 30 slides to a predetermined position, the torsions and the accumulated potential energies of the elastic assemblies 60 reach the maximum, and the engaging flange 564 slides out of the guiding groove 4416 and abuts the tilting wall 4432 of the tilting portion 443. The upper board 30 can further slide over the predetermined position, transferring the elastic strips 62 from the compressing process as above described to an expanding process. During the expanding process, the accumulated potential energies of the elastic assemblies 60 release to further slide the upper board 30 relative to the intermediate board 20. The swinging member 50 swings and the engaging flange 564 slides along the tilting wall 4432. The swinging member 50 is tilted by the tilting wall 4432.

Due to the pivotable connection of the swinging member 50 with the intermediate board 20, the limiting engaging of the side portions 36 and the sliding groove 292. The slidable connection of the pin member 70 with the upper board 30, the swinging member 50, the intermediate board 20, and the upper board 30 can be viewed as an assembly which can only move longitudinally with each other. Thus, the tilting of the swinging member 50 tilts the intermediate board 20 and the upper board 30 tilts relative to the lower board 10. Due to the pivotable connection of the clasping members 28 and the hinge pin 184 of the lower board 10, the intermediate board 20 and the upper board 30 rotates relative to the lower board 10 about the hinge pin 184. The rotation and the tilting stop at the position to have a tilting angle θ where the engaging flange 564 reaches to resist against the blocking wall 442 of the cam member 40. At this time, the upper surface of the intermediate board 20 resists against the outer projection 4414 of the cam member 40, preventing the intermediate board 20 and the upper board 30 from being further tilted by an external force.

Figure 7:
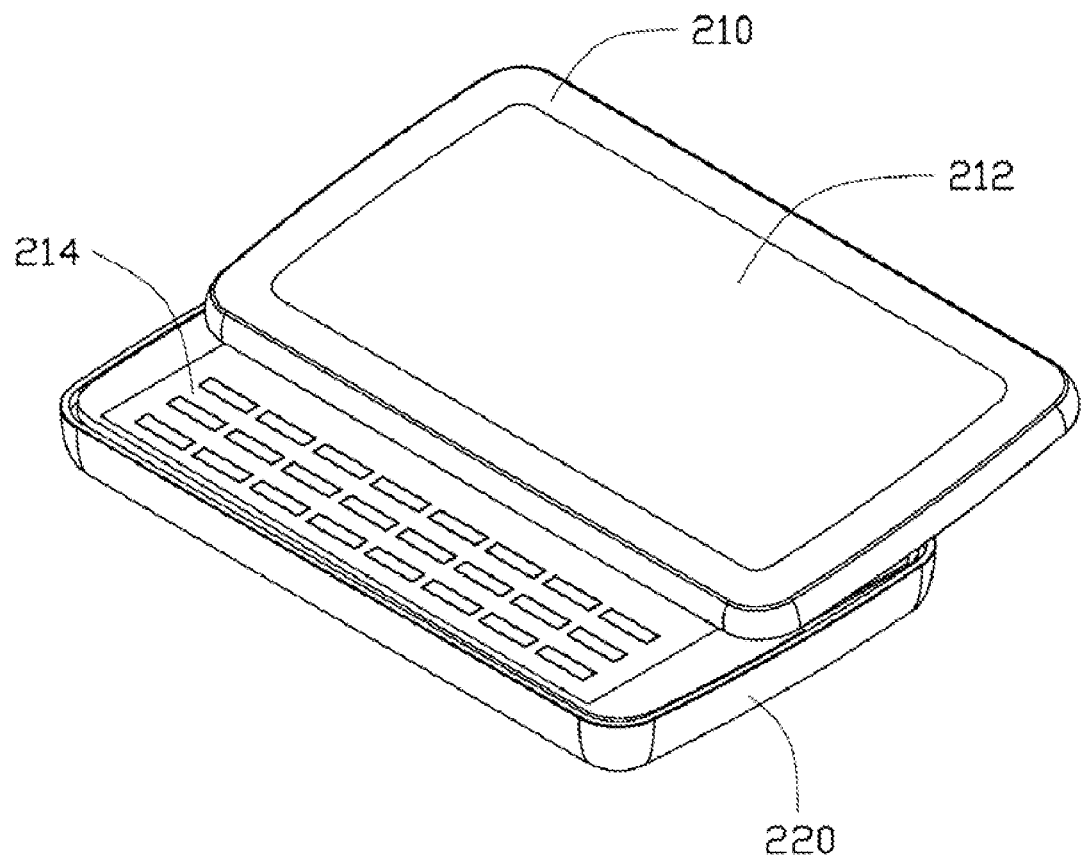
FIG. 7 is an isometric view of a portable electronic device assembled with the sliding and tilting mechanism shown in FIG. 6.

FIG. 7 shows the sliding and tilting mechanism 100 applied to a portable electronic device 200. The portable electronic device 200 includes a first part 210 and a second part 220. The first part 210 is fixed to the upper board 30 and defines a first viewing interface 212. The second part 220 is fixed to the lower board 10 and defines a second operation interface 214. The first part 210 can slide relative to the second part 220 over a predetermined distance by an external force and automatically tilts relative to the second part 220. The first viewing interface 212 can have the tilting angle θ relative to the second operation interface 214.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A sliding and tilting mechanism, comprising:
   a lower board;
   an upper board;
   an intermediate board defines an engaging hole and a pivotable portion, the intermediate board positioned between the lower board and the upper board, pivotably connecting with the lower board, and slidably connecting with the upper board;
   two elastic assemblies positioned between and connecting the upper board and the intermediate board for providing elastic force urging the upper board to automatically slide relative to the lower board after the upper board slides over a predetermined distance along the intermediate board; and a swinging member comprising an engaging flange, the swinging member positioned between the intermediate board and the upper board; and a cam member comprises a tilting portion, the tilting portion engaging and tilting the engaging flange, the cam member secured in the lower board, the swinging member engaging with the cam member to tilt the intermediate board and the upper board relative to the lower board after the upper board slides over the predetermined distance along the intermediate board;
   wherein the tilting portion exposed through the engaging hole; the swinging member swinging about the pivotable portion with its opposite ends engaging with the cam member and the upper board.

2. The sliding and tilting mechanism as claimed in claim 1, further comprising:
   a pin member, the swinging member defining a guiding hole, and the upper board defining a securing hole, the pin member sliding along the guiding hole; and
   the pin member passing through the guiding hole to secure in the securing hole, enabling the swinging member to be relatively fixed to the upper board perpendicular to a sliding direction of the upper board.

3. A sliding and tilting mechanism, comprising:
   a lower board;
   an upper board;
   an intermediate board pivotably connecting with the lower board and defining an engaging hole;
   two elastic assemblies positioned between the upper board and the intermediate board, each of the two elastic assemblies having one end connecting with the intermediate board and the other opposite end connecting with the upper board;
   a cam member comprising a bottom wall and an engaging portion protruding from the bottom wall, the cam member fixed to the lower board and partially exposed through the engaging hole, the engaging portion comprises an arcuate wall and an inner projection extending from the arcuate wall, wherein the inner projection, the arcuate wall and the bottom wall cooperatively define a guiding groove; and
   a swinging member comprising an engaging flange engaging into and sliding along the guiding groove, the swinging member swinging between the upper board and the intermediate board and having one end engaging with the cam member and an other opposite end engaging with the upper board;
   wherein the elastic assembly provides elastic force to urge the upper board to slide further relative to the intermediate board after a predetermined distance and to drive the swinging member to swing to engage with the cam member, the engaging of the swinging member and the cam member enables the upper board and the intermediate board to tilt relative to the lower board at an tilting angle.

4. The sliding and tilting mechanism as claimed in claim 3, wherein:
   the engaging portion further comprises a blocking wall and a tilting portion;
   the tilting portion protrudes from the bottom wall and connects the arcuate wall, the tilting portion comprises a tilting wall connecting the blocking wall;
   the engaging flange sliding and tilting along the tilting wall and blocked by the blocking wall.

5. The sliding and tilting mechanism as claimed in claim 3, wherein the arcuate wall forms an outer projection for maintaining the tilting angle of the intermediate board relative to the lower board.

6. The sliding and tilting mechanism as claimed in claim 3, wherein the lower board defines a fixing hole and latching portions around the fixing hole, the cam member defining latching notches, the latching portions latches into the latching notch, latching the cam member with the lower board.

7. The sliding and tilting mechanism as claimed in claim 3, wherein the intermediate board has a pivotable portion protruding therefrom, the swinging member defines a hinge hole, the pivotally portion pivotably engaging in the hinge hole.

8. The sliding and tilting mechanism as claimed in claim 3, wherein:
   the sliding and tilting mechanism further comprises a pin member;
   the swinging member defines a guiding hole, the upper board defines a securing hole;
   the pin member passing through the guiding hole to secure in the securing hole, enabling the swinging member to be relatively fixed to the upper board perpendicular to the sliding direction of the upper board.

9. The sliding and tilting mechanism as claimed in claim 3, wherein:
   the intermediate board defines two first mounting holes, the upper board defines two second mounting holes with substantially the same structure with the first mounting holes;
   each of the first and second mounting holes comprises a first hole section and a second hole section smaller than the first hole section;
   each elastic assembly defining opposite latching portions having substantially the same shape and size as the first hole section, each latching portion defining an annular slit for latching the latching portions within the second hole section.

10. The sliding and tilting mechanism as claimed in claim 3, wherein the elastic assembly comprises two elastic strips, two ring coils and two latching portions, the elastic strips fixed to the ring coils, the ring coils and the elastic strips pivotably latching to the latching portions.

11. The sliding and tilting mechanism as claimed in claim 3, wherein the intermediate board defines opposite sliding grooves, the upper board defines opposite side portions, the side portions slidably engaging into the sliding grooves.

12. A portable electronic device, comprising:
- a first part;
- a second part; and
- a sliding and tilting mechanism comprising: a lower board fixed to the second part; an upper board fixed to the first part;
- an intermediate board positioned between the lower board and the upper board, pivotably connecting with the lower board, and slidably connecting with the upper board;
- two elastic assemblies positioned between and connecting the upper board and the intermediate board for providing elastic force urging the upper board to automatically slide relative to the lower board after the upper board slides over a predetermined distance along the intermediate board; and
- a swinging member comprises an engaging flange, the cam member comprises a tilting member positioned between the intermediate board and the upper board; and a cam member secured in the lower board, the swinging member engaging with the cam member to tilt the intermediate board and the upper board relative to the lower board after the upper board slides over the predetermined distance along the intermediate board, wherein the intermediate board defines an engaging hole and a pivotable portion, the tilting portion exposing through the engaging hole, and the swinging member swinging about the pivotable portion with opposite ends engaging with the cam member and the upper board.

13. The portable electronic device as claimed in claim 12, further comprising:
- a pin member, the swinging member defining a guiding hole, and the upper board defining a securing hole, the pin member sliding along the guiding hole; and
- the pin member passing through the guiding hole to secure in the securing hole, enabling the swinging member to be relatively fixed to the upper board perpendicular to a sliding direction of the upper board.

* * * * *